United States Patent
Goodman

(12) 
(10) Patent No.: US 6,623,086 B1
(45) Date of Patent: Sep. 23, 2003

(54) NONBLISTERING CHROME-PLATED WHEEL AND METHOD OF FABRICATION

(76) Inventor: Larry K. Goodman, 16200 S. Garfield Ave., Paramount, CA (US) 90723-4883

(*) Notice: Subject to any disclaimer, the term of this patent is extended or adjusted under 35 U.S.C. 154(b) by 0 days.

(21) Appl. No.: 10/194,393

(22) Filed: Jul. 15, 2002

(51) Int. Cl.$^7$ ................................................ B60B 3/04

(52) U.S. Cl. .......................... 301/63.102; 301/63.103; 29/894.322

(58) Field of Search ................. 301/63.101, 63.102, 301/63.103, 63.1; 29/894.322, 894.323, 894.325

(56) References Cited

U.S. PATENT DOCUMENTS

| | | | | |
|---|---|---|---|---|
| 3,612,614 A | * | 10/1971 | Ware | 301/63.101 |
| 3,930,683 A | * | 1/1976 | MacKeown | 301/11.1 |
| 4,341,425 A | * | 7/1982 | Streicher et al. | 301/63.101 X |
| 4,518,204 A | * | 5/1985 | Takada | 301/63.101 |
| 5,988,763 A | * | 11/1999 | Wei | 301/63.101 |
| 6,030,051 A | * | 2/2000 | Hosoda et al. | 301/63.101 |

FOREIGN PATENT DOCUMENTS

| | | | | |
|---|---|---|---|---|
| DE | 3503882 | * | 8/1986 | 301/63.1 |
| JP | 2-60801 | * | 3/1990 | 301/63.1 |

OTHER PUBLICATIONS

Plating Process, Classic Components, Web page No Date.

* cited by examiner

Primary Examiner—Russell D. Stormer
(74) Attorney, Agent, or Firm—Charles H. Thomas

(57) ABSTRACT

An improved automotive vehicle wheel plated with an overcoating, such as chrome, is constructed in such a manner as to be free of the blistering effects of residual acidic and caustic chemicals employed in the chrome-plating process. Like conventional automotive vehicle wheels of this type, the wheel of the invention is comprised of an outer rim into which a wheel center is set. However, unlike conventional wheels, the center of the wheel of the invention is provided with a radially inwardly directed groove into its rim-contacting surface near the outboard extremities of the contacting surfaces of the wheel rim and wheel center. A resilient O-ring is seated in the groove prior to setting the wheel center within the wheel rim. The outer rim is then heated so as to thermally expand it to receive the wheel center. When the rim cools it shrinks into tight, intimate contact with the radially outwardly facing surface of the wheel center. The wheel rim and center are then secured by an annular weld at the inboard extremities of their contacting surfaces. The resilient O-ring prevents caustic or acidic chemicals that are employed in the chrome-plating process from seeping into the interface between the structures of the wheel rim and wheel center. As a consequence, these caustic and acidic substances are not entrapped beneath the overcoating chrome layer, thereby preventing blistering of the chrome coating on the wheel.

19 Claims, 2 Drawing Sheets

NONBLISTERING CHROME-PLATED WHEEL AND METHOD OF FABRICATION

BACKGROUND OF THE INVENTION

1. Field of the Invention

The present invention relates to the fabrication of chrome-plated automotive vehicle wheels, particularly wheels formed of aluminum.

2. Description of the Prior Art

For quite a number of years automotive vehicle wheels have been plated with chrome to enhance their corrosion resistance, as well as to improve their aesthetic appearance. Chrome-plate aluminum wheels and also chrome-plated steel wheels are in widespread use on automotive vehicles.

In the fabrication of an automotive vehicle wheel, particularly an aluminum wheel, the wheel is often constructed of two basic parts. That is, the wheel includes an outer, annular metal wheel rim and an inner wheel center, which is sometimes termed an "inner"0 or "filler"0 in the automotive vehicle wheel fabrication industry.

In the construction of such an automotive vehicle wheel, the outer, annular metal wheel rim and the inner metal wheel center are first fabricated separately. The outer metal wheel rim is formed with a radially inwardly facing center-receiving surface while the wheel center is formed with an outwardly facing rim-contact surface. The diameter of the inwardly facing center-receiving surface of the rim and the rim-contact surface of the wheel center are nominally coextensive with each other.

In order to allow the wheel center to be set within the wheel rim, the annular metal rim is heated, typically to a temperature of between about 375° F. and 450° F. The coefficient of thermal expansion of the metal of which the rim is formed causes the opening in the wheel rim defined by the center-receiving surface to increase sufficiently so that the wheel center can be set within the wheel rim in longitudinal and coaxial alignment therewith. When the wheel rim is allowed to cool, it contracts, thus causing its center-receiving surface to shrink radially inwardly upon the rim-contact surface of the wheel center so that these surfaces reside in tight, intimate contact with each other.

After the wheel rim and center have been assembled together in this fashion, they are welded together. More specifically, an annular weld is created about the inboard circumference of the inboard extremities of the center-receiving surface of the metal wheel rim and the rim-contact surface of the wheel center. The term inboard, as utilized herein, refers to the side of the wheel that faces the brake mechanism, while the term outboard refers to the side of the wheel facing outwardly away from the brake mechanism and away from the structure of the vehicle and against which the lug nuts are fastened when the wheel is in use.

Following the welding process many wheels are chrome-plated to provide corrosion protection and to enhance their appearance. To chrome plate a wheel, the wheel body, that is the assembled wheel rim and wheel center welded together, must first be treated to ensure that the chrome-plating will adhere to the aluminum or other metal of which the wheel body is formed. In a typical chrome-plating process the exposed surfaces of the metal wheel rim and metal center forming the wheel body are first cleaned to remove any grease or other film or contamination on the wheel. The wheel is then chemically stripped. That is, it is placed in an acid or caustic bath to further remove contaminants and condition its surface to accept the chrome-plating. The exposed surfaces of the wheel are then polished, typically in stages beginning with a grit of perhaps one hundred twenty and proceeding to a finer grit, which may be as fine as an eight hundred, for example.

Following the step of polishing, the wheel is then copper-plated. This step is performed by placing the wheel in an acid solution containing copper. Following the copper plating process, the wheel is then buffed again and plated, first with nickel and then with chrome. Both the nickel and chrome-plating solutions are acid bath solutions. Following the step of chrome plating, the wheel is then ready for use.

Most wheels that are properly treated in the plating process will retain their chrome plating in unblemished condition for many years. However, in a significant number of wheels, the acids and other chemical employed in the plating process seep into the interface between the radially inwardly facing center receiving surface of the wheel rim and the radially outwardly facing rim-contact surface of the wheel center at the unwelded, outboard extremities of these surfaces, despite the extremely tight fit between these surfaces. Some residual quantities of acids and other chemicals from the plating process are then trapped beneath the chrome overcoating layer that is applied to the exposed surfaces of the wheel. These residual acids and caustic chemicals then attack the chrome overcoating from beneath to form blisters in the chrome coating on the wheel. Such blisters are unsightly when they form, and inevitably break, thereby creating gaps in the chrome coating on the wheel. The portion of the wheel body exposed at these gaps is thereby subject to deterioration. The owner of the wheel is then quite dissatisfied, and the wheel is often returned as being defective.

While the great majority of chrome-plated wheels do not suffer this type of degradation, the number of wheels that do prove to be defective in this manner is significant enough to represent a continuing annoying and expensive problem to entities that chrome plate wheels. While this problem has persisted for years, no satisfactory solution has heretofore been found to prevent it.

SUMMARY OF THE INVENTION

The present invention involves an automotive vehicle wheel that is fabricated in such a manner as to prevent residual acids and other chemicals from seeping into the interface between the radially inwardly facing center receiving surface of the metal wheel rim and the radially outwardly facing rim-contact surface of the wheel center during the treatment of the wheel in the chrome-plating process. The invention is equally applicable to wheels which may be plated with other metals, such as nickel, for example.

The present invention involves a unique wheel construction that forms a barrier to residual acids and other chemicals at the outboard extremity of the interface between the contacting surfaces of the wheel rim and the wheel center. This barrier prevents damaging chemicals from flowing or seeping into the interface between the wheel rim and the wheel center.

The unique construction of a plated automotive vehicle wheel according to the invention involves the formation of a narrow, annular channel into the radially outwardly facing rim-contact surface of the wheel center near the outboard extremity of that surface, and the provision of a resilient O-ring within that channel. The O-ring is present in the channel when the wheel rim and wheel center are assembled together and is partially compressed to form a fluid-tight seal between the wheel rim and the wheel center as the wheel rim cools following insertion of the center into it. By locating the channel and resilient O-ring quite close to the outboard extremities of the mating surfaces of the wheel rim and the wheel center, damaging chemicals are excluded from entering between the surfaces.

In one broad aspect the present invention may be considered to be a metal-plated automotive vehicle wheel comprising: an outer, annular metal wheel rim having a radially inwardly facing center-receiving surface that has opposing inboard and outboard extremities; a metal wheel center set within the wheel rim and having a radially outwardly facing rim-contact surface that resides in face-to-face contact with the center-receiving surface between the inboard and outboard extremities thereof, and wherein a radially inwardly directed channel is defined in the rim-contact surface proximate the outboard extremity of the center-receiving surface; and a resilient O-ring is disposed in the channel and compressed against the center-receiving surface of the rim, and said wheel center is welded to the wheel rim at the inboard extremity of the center-receiving surface, and the wheel rim with the wheel center set therewithin are externally plated with a metal overcoating.

While the wheel rim and the wheel center may be formed of a wide variety of metals, they are both typically formed of aluminum. Also, the metal overcoating may be a coating of a wide variety of metals, but typically contains chromium.

Because the annular metal wheel rim is heated to expand its inner radius in order to set the wheel center within it, the resilient O-ring should be formed of a material that will withstand an elevated temperature, typically a temperature of at least 400° F. without melting. In a preferred embodiment of the invention the resilient O-ring is formed of a silicon-based rubber compound. Suitable materials for fabricating the O-ring are sometimes referred to as "engineered rubbers".

The channel for the O-ring should be located quite close to the outboard extremity of the interface between the mutually contacting surfaces of the wheel rim and the wheel center. Preferably, the channel is located no more than about 0.04 inches from the outboard extremity of the rim-contact surface, and preferably is located about one-thirty-second of an inch from the outboard extremity of the rim-contact surface.

Typically the channel is directed into the structure of the wheel center perpendicular to the axis of the wheel. However, in some wheels the surface configuration of the wheel center is such that it is inadvisable to from the channel for the O-ring in a plane perpendicular to the wheel axis. In some wheel configurations the periphery of the wheel center flares outwardly at its outboard extremity so that there would be insufficient structure remaining beneath the rim-contact surface if the channel is oriented in a plane perpendicular to the axis of the wheel. In such a situation the channel should be defined at an angle relative to the wheel axis inclined radially inwardly and away from the outboard extremity of the wheel contact surface.

The resilient O-ring will still make contact both with the floor of the channel defined in the rim-contact surface of the wheel center and also the radially inwardly facing center-receiving surface of the wheel rim. By defining the channel at an inclination relative to the wheel axis, however, sufficient structure remains at the outboard periphery of the wheel center so that the structural integrity of the wheel center is not compromised.

The channel that is defined in the rim-contact surface of the wheel center is quite narrow and quite shallow. Typically, the channel will be slightly less than about an eighth of an inch in width and an eighth of an inch in depth. The undeformed cross-sectional diameter of the O-ring is then preferably about one-eighth of an inch.

In another broad aspect the invention may be considered to be an improvement in an externally plated metal automotive vehicle wheel formed with an outer, annular metal wheel rim having a radially inwardly facing center-receiving surface that has opposing inboard and outboard extremities and an inner metal wheel center having a radially outwardly facing rim-contact surface that has a inboard and outboard extremities and which resides in contact with the center-receiving surface. As in conventional wheels of this type, the wheel rim and the wheel center are welded together at the inboard extremities of the rim-contact surface and the center-receiving surface. According to the improvement of the invention a radially inwardly directed channel is defined in the rim-contact surface proximate the outboard extremity thereof. Also, a resilient, annular O-ring is disposed in the channel and is compressed against the center-receiving surface of the wheel rim. As previously indicated, the fabrication of a wheel in this manner presents a barrier to acids and other chemicals from entering into the interface between the wheel rim and the wheel center.

In still another broad aspect the invention may be considered to be a method of fabricating an externally plated metal wheel. The method is comprised of several steps. An outer, annular metal wheel rim is formed with external surfaces and a radially inwardly facing center-receiving surface that has opposing inboard and outboard extremities. A metal wheel center is formed with external surfaces and an outwardly facing rim-contact surface having opposing inboard and outboard extremities. A radially inwardly directed annular channel is defined into the rim-contact surface proximate the outboard extremity thereof. A resilient, annular O-ring is inserted into the annular channel. The wheel rim is heated to increase its diameter due to thermal expansion. The wheel center is then set within the heated wheel rim. The wheel rim is cooled, whereby the center receiving surface compresses the resilient o-ring and shrinks into intimate contact with the rim-contact surface, both inboard and outboard from the resilient O-ring between the inboard and outboard extremities of both the rim-contact surface and the center-receiving surface. The wheel center is welded to the wheel rim at the inboard extremities of the rim-contact surface and the center-receiving surface to thereby produce an assembled wheel body. This assembled wheel body is then plated with a metal overcoating.

Typically, the assembled wheel body is treated prior to plating to produce a finish thereon that will accept the metal plating. This treatment normally involves dipping the wheel in several acid baths and/or caustic baths having a high pH and ultimately into a liquid solution containing chromium.

The invention may be described with greater clarity and particularity by reference to the accompanying drawings.

DESCRIPTION OF THE EMBODIMENTS AND IMPLEMENTATION OF THE METHOD

Figure 1:
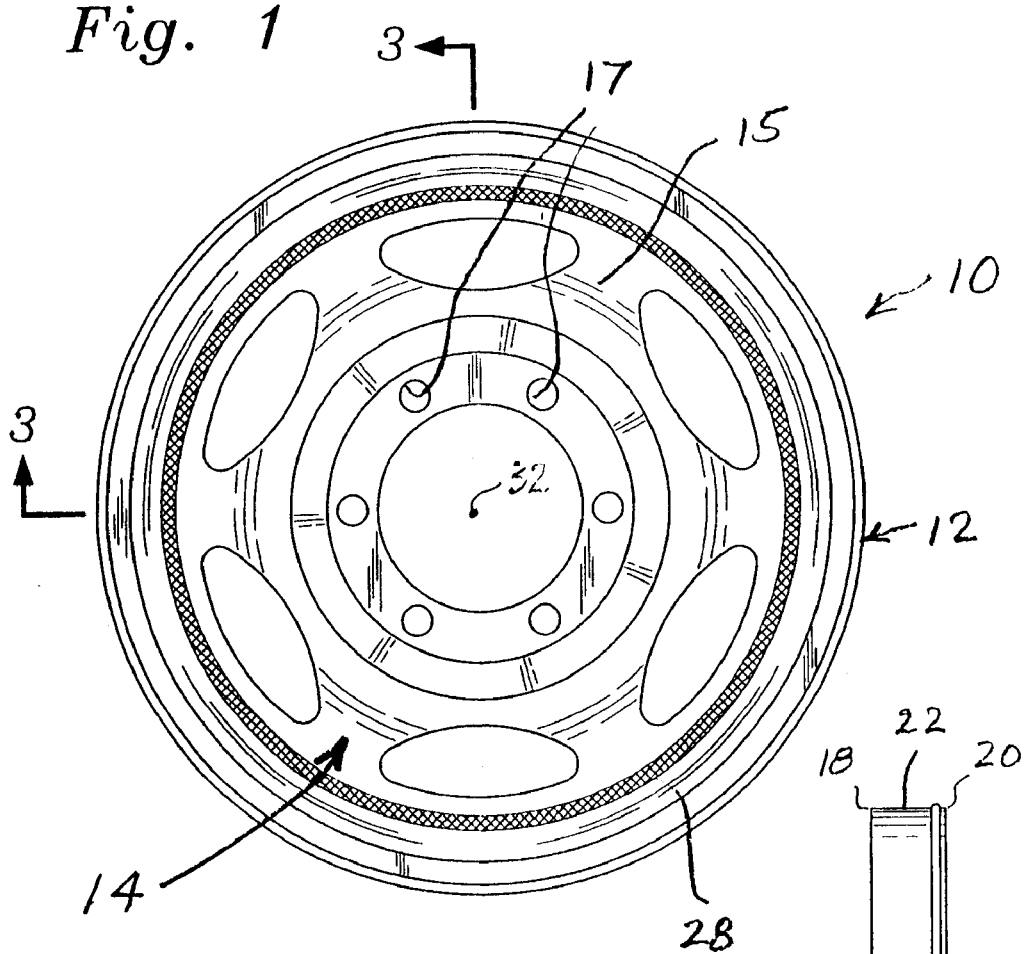
FIG. 1 is an elevational view of the inboard face of an externally plated metal automotive vehicle wheel constructed and fabricated according to the invention.

FIG. 1 illustrates a metal, automotive vehicle wheel generally at 10 designed for use on an automobile or a truck. Wheels 10 of this type are typically formed in diameters of sixteen, seventeen, eighteen, twenty, and twenty-two inches.

The wheel 10 is comprised of an outer, annular metal wheel rim 12, which is sometimes referred to in the trade as a "hoop"0 or "outer". The wheel 10 is also comprised of a metal wheel center 14, that is illustrated from the side in isolation in FIG. 2. The wheel center 14 is formed with the usual spokes 15 and bolt openings 17 for mounting the wheel 10 upon a automotive vehicle, as shown in FIG. 1.

Figure 4:
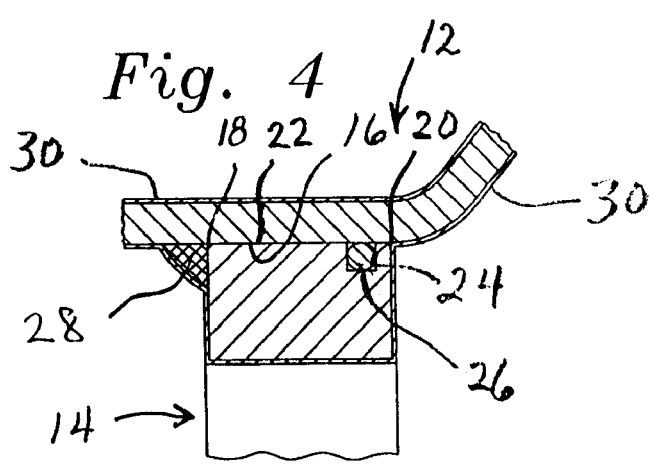
FIG. 4 is a detail of the portion of FIG. 3 indicated at 4.
Figure 3:
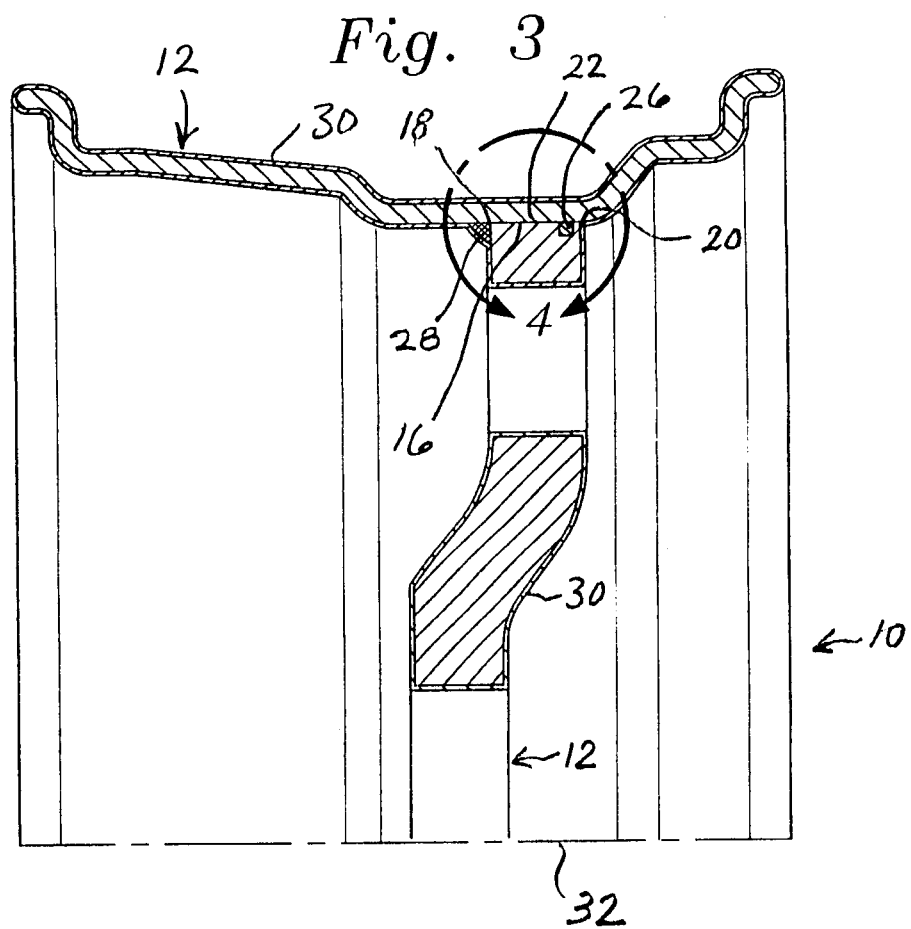
FIG. 3 is a sectional view taken along the lines 3—3 of FIG. 1.

The metal wheel rim 12 has a radially inwardly facing center-receiving surface 16 that has opposing inboard and outboard extremities 18 and 20, respectively. The metal wheel center 14 is set within the wheel rim 12, as illustrated in FIGS. 1, 3, and 4, and has a radially outwardly facing rim-contact surface 22 that resides in face-to-face contact with the center-receiving surface 16 of the wheel rim 12 between the inboard extremity 18 and the outboard extremity 20 thereof, as illustrated in FIGS. 1, 3 and 4. The surfaces 16 and 22 are coextensive with each other. The inboard extremities of both the center-receiving surface 16 of the wheel rim 12 and the rim-contact surface 22 of the wheel center 14 are therefore both designated by the reference number 18. Likewise, the outboard extremities of both the center-receiving surface 16 of the wheel rim 12 and the rim-contact surface 22 of the wheel center 14 are both designated by the reference number 20.

As best illustrated in FIG. 4, a radially inwardly directed channel 24 is defined in the rim-contact surface 22 proximate the outboard extremity 20 of the surface 22 and of the center-receiving surface 16 of the wheel rim 12. As shown in FIGS. 3 and 4, a resilient, silicon-based rubber O-ring 26 is disposed in the channel 24. The resilient O-ring 26 is compressed in the channel 24 and against the center-receiving surface 16 of the rim 12. As illustrated in FIGS. 1, 3, and 4, the wheel center 14 is welded to the wheel rim 12 with an annular weld 28 that extends around the entire circumference of the wheel center 14 at the inboard extremity 18 of the center-receiving surface 16 of the wheel rim 12 and of the rim-contact surface 22 of the wheel center 14.

The wheel rim 12 and the wheel center 14 set therewithin are externally plated with a protective chrome metal overcoating 30. The overcoating 30 exists on all of the exposed surfaces of the wheel rim 12 and wheel center 14. These exposed surfaces include all of the surface of the wheel rim 12 and wheel center 14, with the exception of the center-receiving surface 16 of the wheel rim 12, the rim-contact surface 22 of the wheel center 14, and the surfaces of the wheel rim 12 and wheel center 14 that are covered by the weld 28.

In the embodiment of the invention illustrated in FIGS. 1–4, the wheel 10 has a central axis 32 and the channel 24 defined in the rim-contact surface 22 is oriented perpendicular to the wheel axis 32. That is, the inboard and outboard walls of the channel 24 reside in planes perpendicular to the wheel axis 32 and the floor of the channel 24 is formed as a narrow, cylindrical band coaxial with the wheel axis 32.

The channel 24 is located very close to the outboard extremities 22 of both the center-receiving surface 16 of the wheel rim 12 and the rim-contact surface 22 of the wheel center 14. The outboard extremities of both these surfaces are coincident with each other and are indicated by the reference number 20. Likewise, the inboard extremities of the rim-contact surface 22 and the center-receiving surface 16 are also coincident with each other, and are indicated by the reference number 18. The outboard wall of the channel 24 closest to the outboard face of the wheel center 14 is defined so as to leave a channel wall thickness of only one-thirty-second of an inch. The channel 24 is slightly less than one-eighth of an inch in width, as measured parallel to the wheel axis 32, and in depth, as measured perpendicular to the wheel axis 32.

The O-ring 26 has a cross-sectional diameter of one-eighth of an inch and therefore is slightly compressed against the center-receiving surface 16 of the rim 12 when the wheel center 14 has been set within the wheel rim 12. The O-ring 26 is formed of a substance that will not melt up to a temperature of at least 400° F. Preferably, the O-ring 26 is formed of silicon-based rubber and will withstand a temperature of up to 500° F.

In the fabrication of the wheel 10, the outer, annular metal wheel rim 12 and the metal wheel center 14 are initially formed as separate aluminum structures. The radially inwardly directed annular channel 24 is defined in the outwardly facing rim-contact surface 22 of the wheel center 12 using a lathe.

Figure 2:
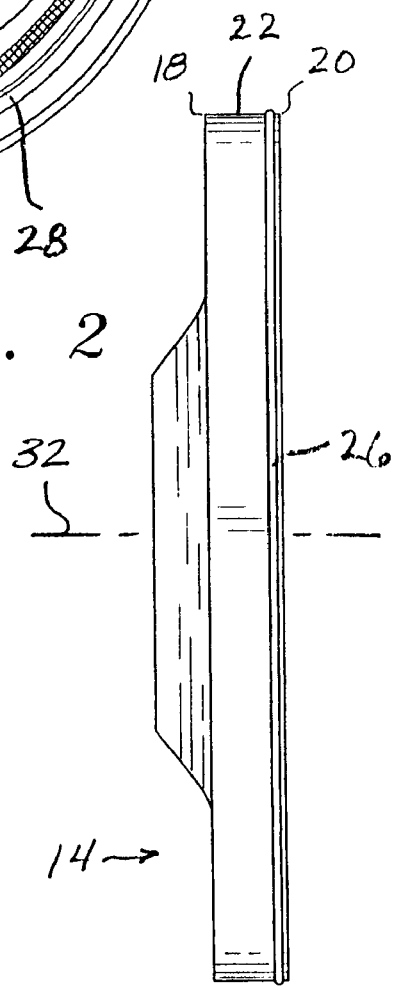
FIG. 2 is a side elevational view of the metal wheel center employed in the wheel of FIG. 1.

The resilient, annular O-ring 26 is then inserted into the channel 24. The O-ring 26 has a cross-sectional diameter of one-eighth of an inch and encircles an area of much larger diameter as determined by the size of the wheel 10. The O-ring 26 is preferably of a size so that it is stretched slightly when installed in the channel 24. Once the O-ring 26 has been seated in the channel 24, as illustrated in FIG. 2, the wheel center 14 and the wheel rim 12 are ready for assembly together.

The radially inwardly facing center-receiving surface 16 of the wheel rim 12 and the radially outwardly facing rim-contact surface 22 of the wheel center 14 are formed with the same diameter. In order to allow the wheel center 14 to be set within the outer rim 12, it is necessary to heat the outer rim 12 sufficiently to expand the inner diameter of the center-receiving surface 16. This expansion occurs due to thermal expansion of the metal of which the rim 12 is constructed. In this connection the wheel rim 12 is first heated to a temperature of typically about 375° F.–450° F. In the fabrication shop conditions, the exact temperature to which the wheel rim 12 is heated may vary considerably within this range.

The outer wheel rim 12 is heated until it expands approximately 0.020 inches in diameter. This is sufficient to allow the wheel center 14 to be set within the rim 12 with the center-receiving surface 16 and the rim-contact surface 22 coextensive with each other, considered in a longitudinal direction along the wheel axis 32. The rim 12 is then allowed to cool, whereupon it shrinks so that the center-receiving surface 16 decreases about 0.02 inches in diameter into tight, intimate contact with the radially outwardly facing rim-contact surface 22. As the outer rim 12 shrinks, it compresses the O-ring 26 slightly against the center-receiving surface 16 and the floor and walls of the channel 24.

Once the wheel center 14 has been set within the surrounding rim 12, the wheel center 14 is welded to the wheel rim 12 at the inboard extremities 18 of the rim-contact surface 22 and the center-receiving surface 16. Once the weld 28 has been completed to encircle the inboard interface between the wheel rim 12 and the wheel center 14, the structure is an assembled wheel body.

The wheel body formed by the wheel center 14 set in and welded to the wheel rim 12 is then treated in preparation to receive the chrome coating 30. Specifically, the wheel body is typically dipped into a cleaning solution. A variety of different strong chemicals may be employed for this purpose. For example, the Chemetall Oakite cleaning product Pyrene 1226 may be mixed with water at a concentration of one percent to five percent by volume and heated to between about 120° F. to about 160° F. The wheel body may be dipped in this solution to remove oil and shop soil from the external surfaces of the wheel body. Pyrene 1226 may be obtained from Oakite Products, Inc., located at 50 Valley Road, Berkeley Heights, N.J. 07922.

Thereafter, the wheel body may be chemically stripped by immersion in an etching solution. Many different strong chemicals may be employed for this purpose. For example, ChemEtch 7006 in water, typically in a concentration range of four and a half percent to five and a half percent by volume may be used. ChemEtch 7006 is a liquid, caustic-based aluminum etchant for immersion tank applications. It etches aluminum to eliminate surface imperfections and produces a matte satin finish. ChemEtch 7006 is a highly alkaline product with a pH of between about 13.0 to 14.0. Alternatively, the wheel body may be chemically stripped utilizing an acidic product, such as Chemcid 2059. Chemcid 2059 is a liquid acidic product which etches and deodorizes aluminum and aluminum alloys, and is less aggressive than conventional caustic-type etchants. Chemcid 2059 is typically used in a concentration of fifteen percent by volume and is heated to a temperature of between about 140° F. to about 160° F. for immersion of the wheel body. Both of these products are also available from Oakite Products, Inc.

Other chemicals which are sometimes used in treating the aluminum wheel body prior to deposition of a copper or nickel plating are Chemcid 2053, which is a highly acidic product, also obtainable from Oakite Products, Inc. Another substance that is sometimes used is Tasprep Opti-bond Concentrate, sold by Taskem, Inc., located at 4639 Van Epps Road, Brooklyn Height, Ohio 44131. This substance is a ready-to-use solution for depositing on aluminum alloys prior to electroplating.

Following chemical stripping, the wheel body is polished and then plated with copper. One suitable copper-plating process is the Acclaim ND process which is used in a variety of different types of copper-plating operations. The substances employed in this process are also available from Taskem, Inc. This process employs Acclaim ND Part A and Acclaim ND Part B.

The copper plating is then polished. Polishing may be performed chemically utilizing Oakite Brite Dip CB and/or Oakite Inhibitor CB, both available from Oakite Products, Inc. The wheel body may then be nickel plated utilizing Criterion Intrigue Brightener, Criterion SB-2 Additive, and Criterion Intrigue Carrier, which may be procured from Taskem, Inc. Criterion Air Wetter may also be required in this process. The Criterion Maxima Premiere Process may also be employed for nickel plating. The chemicals for this process are likewise available from Taskem, Inc.

After Nickel plating, the wheel body is then immersed in a chrome-plating bath that typically contains a liquid catalyst for chrome plating, such a Taskem Supper Cat, which may be procured from Taskem, Inc. Whatever process is employed, when the automotive vehicle wheel 10 is withdrawn from the chrome-plating solution, it has an overcoating 30 containing chromium on all of its external surfaces. The overcoating 30 may contain chromium oxide ($Cr_2O_3$) as an outermost film.

Despite its treatment with acidic and caustic chemicals, the wheel 10 produced according to the present invention is not subject to degradation due to residual chemicals seeping into the interface between the radially inwardly facing center-receiving surface 16 or the wheel rim 12 and the radially outwardly facing rim-contact surface 22 of the wheel center 14. To the contrary, the close proximity of the sealing O-ring 26 to the outboard extremity 20 of these surfaces precludes the entry of caustic and acidic chemicals used during the cleaning, etching, and plating processes. These chemicals are blocked by the O-ring 26 from reaching the interface between the wheel rim 12 and the wheel center 14 at the outboard face thereof. The weld 28 prevents these chemicals from entering the interface between the rim 12 and wheel center 14 from the inboard face of the wheel 10.

A wheel constructed according to the method of the invention and with the structural features of the invention does not exhibit the characteristic blistering that sometimes occurs in conventional chrome-plated wheels. The invention thereby provides a significant improvement in chrome-plated wheel construction, particularly aluminum wheels.

Figure 5:
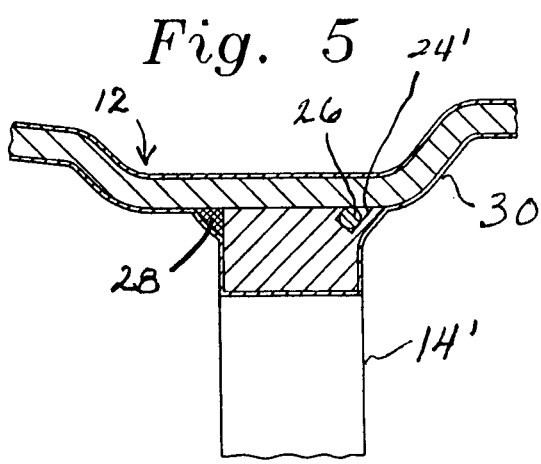
FIG. 5 is a sectional detail comparable to FIG. 4 illustrating an alternative embodiment of a chrome-plated automotive vehicle wheel to that shown in FIGS. 1–4.
Figure 6:
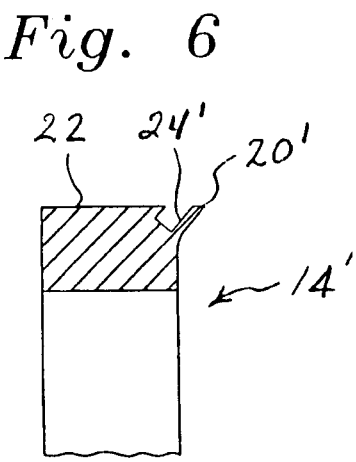
FIG. 6 is a sectional detail illustrating the periphery of the wheel center employed in the embodiment illustrated in FIG. 5.

In some wheels the surface configuration of the wheel center requires the channel formed in the rim-contact surface to be configured somewhat differently than illustrated in FIGS. 3 and 4. Specifically, FIGS. 5 and 6 illustrate a wheel center 14', the outboard periphery of which flares radially outwardly and in an outboard direction as indicated at 20'. As a consequence, there is insufficient structure at the outboard peripheral edge of the wheel center 14' for a channel to be defined perpendicular to the wheel axis 32. In such an situation the channel 24' should be defined in the rim-contact surface 22 at an inclination away from the outboard extremity 20' of the rim-contact surface 22 and toward the wheel axis 32, as best illustrated in FIG. 6. That is, there should always be a structural thickness of at least one-thirty-second of an inch between the outboard wall of the channel and the outboard face of the wheel center 14'. As illustrated in FIG. 5, when the O-ring 26 is inserted into the channel 24', the rim 12 may be assembled with the wheel center 14' and provided with a chrome overcoating 30 in the same manner previously described.

Undoubtedly, numerous variations and modifications of the invention will become readily apparent to those familiar with the fabrication of automotive vehicle wheels. For example, the invention is applicable to steel wheels, as well as aluminum wheels and to wheels having overcoatings of nickel, copper, or other metals, as well as chromium. Accordingly, the scope of the invention should not be construed as limited to the specific embodiments and implementation of the method described, but is defined in the claims appended hereto.

I claim:

1. A metal-plated automotive vehicle wheel comprising:
   an outer, annular metal wheel rim having a radially inwardly facing center receiving surface that has opposing inboard and outboard extremities, and
   a metal wheel center set within said wheel rim and having a radially outwardly facing rim-contact surface that resides in face-to-face contact with said center receiving surface between said inboard and outboard extremities thereof, and wherein a radially inwardly directed channel is defined in said rim-contact surface proximate said outboard extremity of said center receiving surface, and a resilient O-ring is disposed in said channel and compressed against said center receiving surface of said rim, and said wheel center is welded to said wheel rim at said inboard extremity of said center receiving surface, and said wheel rim with said wheel center set therewithin are externally plated with a metal overcoating.

2. An automotive vehicle wheel according to claim 1 wherein said wheel rim and said wheel center are both formed of aluminum.

3. An automotive vehicle wheel according to claim 2 wherein said metal overcoating contains chromium.

4. An automotive vehicle wheel according to claim 1 wherein said resilient O-ring is formed of a material that will withstand a temperature of at least 400° F. without melting.

5. An automotive vehicle wheel according to claim 4 wherein said resilient O-ring is formed of a silicon-based rubber compound.

6. An automotive vehicle wheel according to claim 1 wherein said channel is located no more that about 0.04 inches from said outboard extremity of said rim-contact surface.

7. An automotive vehicle wheel according to claim 6 wherein said channel is located about one-thirty-second of an inch from said outboard extremity of said rim-contact surface.

8. An automotive vehicle wheel according to claim 1 wherein said wheel has an axis and said channel is defined at an angle relative to said wheel axis inclined radially inwardly and away from said outboard extremity of said rim-contact surface.

9. An automotive vehicle wheel according to claim 1 wherein said O-ring has a cross-sectional diameter of about one-eighth of an inch.

10. In an externally plated metal automotive vehicle wheel formed with an outer, annular metal wheel rim having a radially inwardly facing center receiving surface that has opposing inboard and outboard extremities, an inner metal wheel center having a radially outwardly facing rim-contact surface that has inboard and outboard extremities and which resides in contact with said center receiving surface, and wherein said wheel rim and said wheel center are welded together at said inboard extremities of said rim-contact surface and said center receiving surface, the improvement wherein a radially inwardly directed channel is defined in said rim-contact surface proximate said outboard extremity thereof, and a resilient, annular O-ring is disposed in said channel and compressed against said center receiving surface of said wheel rim.

11. An automotive vehicle wheel according to claim 10 wherein both said wheel rim and said wheel center are fabricated of aluminum.

12. An automotive vehicle wheel according to claim 11 wherein said wheel has an external plating of metal that includes chromium in its composition.

13. An automotive vehicle wheel according to claim 10 wherein said O-ring is comprised of a material that withstands a temperature of at least about 400° F. without melting.

14. An automotive vehicle wheel according to claim 13 wherein said O-ring material includes rubber in its composition.

15. An automotive vehicle wheel according to claim 13 wherein said O-ring material includes silicon-based rubber in its composition.

16. An automotive vehicle wheel according to claim 10 wherein said wheel has an axis and said channel is defined in said rim-contact surface at an inclination away from said outboard extremity of said rim-contact surface and toward said wheel axis.

17. A method of fabricating an externally plated metal wheel comprising:

forming an outer, annular metal wheel rim with external surfaces and a radially inwardly facing center receiving surface that has opposing inboard and outboard extremities, forming a metal wheel center with external surfaces and an outwardly facing rim-contact surface having opposing inboard and outboard extremities, defining a radially inwardly directed annular channel into said rim-contact surface proximate said outboard extremity thereof, inserting a resilient, annular O-ring into said annular channel, heating said wheel rim to increase its diameter due to thermal expansion, setting said wheel center within said heated wheel rim, cooling said wheel rim, whereby said center receiving surface compresses said resilient O-ring and shrinks into intimate contact with said rim-contact surface both inboard and outboard from said resilient O-ring between said inboard and said outboard extremities of both said rim-contact surface and said center receiving surface, welding said wheel center to said wheel rim at said inboard extremities of said rim-contact surface and said center receiving surface to thereby produce an assembled wheel body, and plating said assembled wheel body with a metal overcoating.

18. A method of fabricating an externally plated metal wheel according to claim 17 further comprising treating said assembled wheel body after said step of welding to produce a finish that will accept a metal plating.

19. A method of fabricating an externally plated metal wheel according to claim 18 wherein said step of plating is performed in a liquid solution containing chromium.

* * * * *